US008627225B2

(12) United States Patent
Adams

(10) Patent No.: US 8,627,225 B2
(45) Date of Patent: Jan. 7, 2014

(54) APPARATUS AND METHODS FOR ENSURING CLOSURE OF DISPLAYS

(75) Inventor: James S. Adams, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 1904 days.

(21) Appl. No.: 11/449,961

(22) Filed: Jun. 9, 2006

(65) Prior Publication Data

US 2007/0285408 A1 Dec. 13, 2007

(51) Int. Cl.
*G06F 3/048* (2013.01)

(52) U.S. Cl.
USPC .......................... 715/781; 715/806

(58) Field of Classification Search
USPC ............... 715/764, 781, 806; 345/418, 530
See application file for complete search history.

(56) References Cited

U.S. PATENT DOCUMENTS

| | | | |
|---|---|---|---|
| 4,574,364 A | 3/1986 | Tabata et al. | |
| 5,060,170 A | 10/1991 | Bourgeois et al. | |
| 5,091,866 A | 2/1992 | Takagi | |
| 5,390,295 A | 2/1995 | Bates et al. | |
| 5,487,143 A | 1/1996 | Southgate | |
| 5,657,463 A | 8/1997 | Bingham | |
| 5,734,380 A | 3/1998 | Adams et al. | |
| 5,796,403 A | 8/1998 | Adams et al. | |
| 6,313,880 B1* | 11/2001 | Smyers et al. | 348/552 |
| 6,509,915 B2 | 1/2003 | Berman et al. | |
| 6,630,946 B2* | 10/2003 | Elliott et al. | 715/781 |
| 6,678,867 B2 | 1/2004 | Fong et al. | |
| 6,724,406 B1 | 4/2004 | Kelley | |
| 6,873,345 B2 | 3/2005 | Fukuda et al. | |
| 7,386,807 B2* | 6/2008 | Cummins et al. | 715/797 |
| 7,424,644 B2* | 9/2008 | Canning et al. | 714/34 |
| 2005/0050148 A1* | 3/2005 | Mohammadioun et al. | 709/206 |
| 2006/0005085 A1* | 1/2006 | Zunino et al. | 714/47 |
| 2006/0070008 A1 | 3/2006 | Sauve et al. | |
| 2006/0190838 A1* | 8/2006 | Nadamoto | 715/781 |
| 2006/0200702 A1* | 9/2006 | Canning et al. | 714/38 |
| 2006/0271205 A1* | 11/2006 | Abe | 700/9 |
| 2006/0271918 A1* | 11/2006 | Abe | 717/131 |
| 2007/0156835 A1* | 7/2007 | Pulkowski et al. | 709/207 |

* cited by examiner

*Primary Examiner* — Rashawn Tillery

(57) ABSTRACT

Devices, systems and methods for controlling displays in a multi-display environment are disclosed. An exemplary method may create a request to close a display in response to a request inputted to the display system. The method may generate a display monitoring thread in response to a request inputted to the display system. The method may determine if the display has closed and create a second request to close a display when the display has not closed.

22 Claims, 6 Drawing Sheets

APPARATUS AND METHODS FOR ENSURING CLOSURE OF DISPLAYS

FIELD OF THE INVENTION

The present invention relates to a display system, and more particularly, to a method for organizing software application displays by categories, enabling subsequent management of these displays based on the category.

BACKGROUND OF THE INVENTION

In control room environments, operators depend on the control system to manage closure of process control graphic displays as new process control windows or displays are invoked. Operators depend on applications to close displays being replaced by newly invoked displays in a workspace environment. Applications may currently implement this closure via a request to the display being closed, in the form of a specific message (WM_CLOSE) sent to the display window. However, applications being replaced may in fact not close upon receipt of this message, due to various factors including errors on close or other implementation or functional issues. When applications fail to close as requested, problems ensue, including utilization of system resources, operator confusion and even failure of the control system to respond to further operational commands.

Accordingly, an efficient and effective system is needed for ensuring that the display windows have properly closed and are not going to interfere with new displays or cause operator confusion. In addition, systems are needed to monitor the closure of the requested display and take additional action to ensure the display will close.

SUMMARY OF THE INVENTION

It is, therefore, an objective of the present invention to provide devices, systems, and methods to controlling and monitoring closure of displays in a multi-display environment. In one embodiment, an exemplary system creates a request to close a display in response to a request inputted to the display system. The system may generate a display monitoring thread in response to a request inputted to the display system. The system may determine if the display has closed and create a second request to close a display when the display has not closed.

Embodiments of the invention may incorporate one or more of the following aspects. According to one exemplary embodiment, the system may determine if the display has closed for a second time and terminate the process associated with the display when the display has not closed for the second time. In another embodiment, the system may wait a predetermined amount of time prior to creating a second request to close a display when the display has not closed. In another embodiment, the system determines if the display has closed for a second time and creates a third request to close a display when the display has not closed. In yet another embodiment, the system may determine if the display has closed for a third time and terminate the process associated with the display when the display has not closed for the third time.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
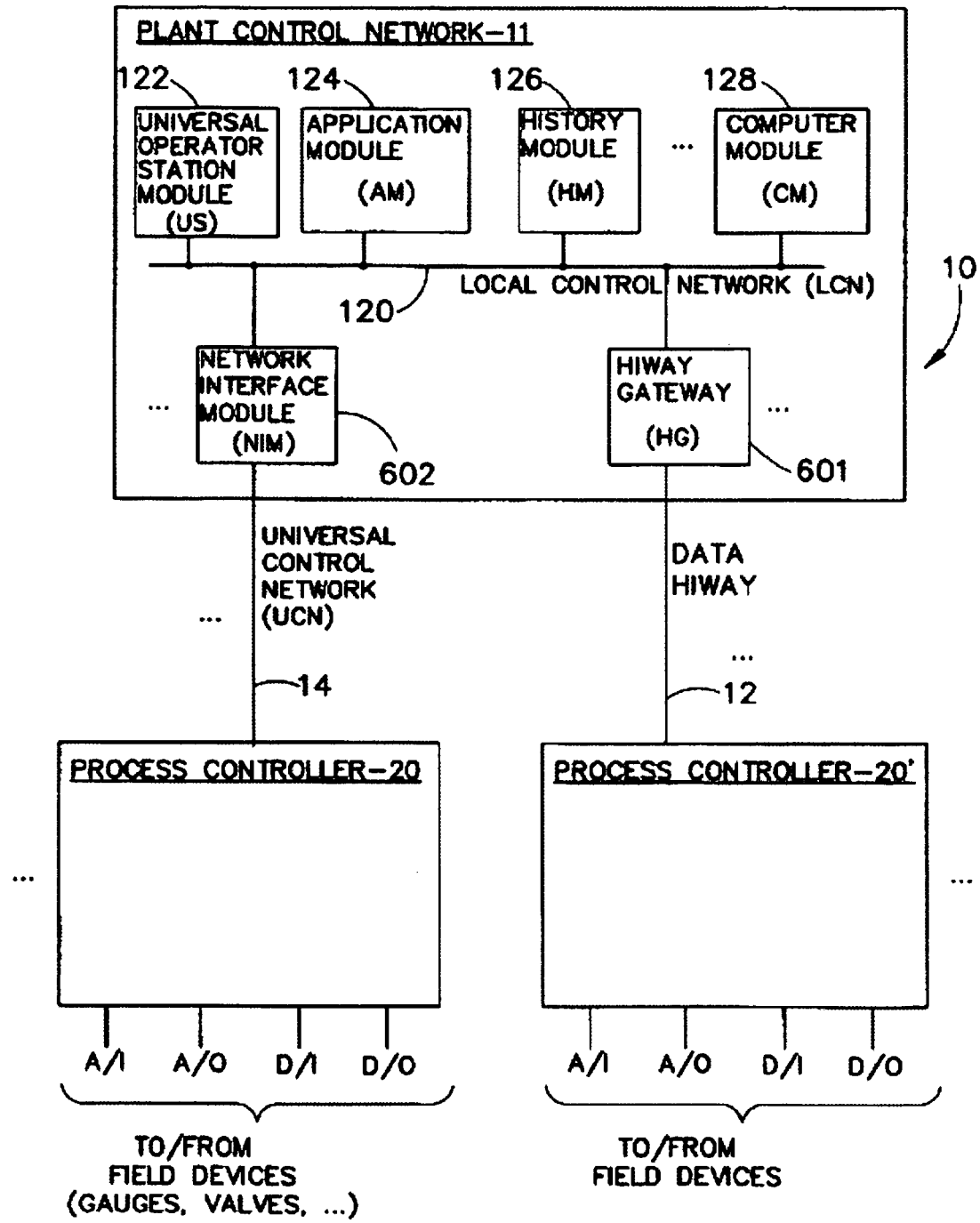
FIG. 1 shows a block diagram of a process control system of an exemplary embodiment in which the present invention can be utilized.

Before describing the method of the present invention, it will be helpful in understanding a system environment in which the invention is utilized. Referring to FIG. 1, there is shown a block diagram of a process control system 10 of the preferred embodiment in which the present invention can be found. The process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, an interface apparatus which includes many new additions, improvements, and features over the process controller 20', is operatively connected to the plant control network 11 via a universal control network (UCN) 14 to a network interface module (NIM) 602. In the preferred embodiment of the process control system 10 additional process controllers 20 can be operatively connected to the plant control network 11 via a corresponding UCN 14 and a corresponding NIM 602. The process controllers 20, 20' interface the analog input and output signals and digital input and output signals (A/I, A/O, D/I, and D/O respectively) to the process control system 10 from the variety of field devices (not shown) of the process being controlled which include valves, pressure switches, pressure gauges, thermocouples, . . .

The plant control network (or more simply the network) 11 provides the overall supervision of the controlled process in conjunction with the plant operator and obtains all the information needed to perform the supervisory function and includes an interface with the operator. The plant control network 11 includes a plurality of physical modules (or nodes), which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120, which permits each of these modules to communicate with each other as necessary. The NIM 602 and HG 601 provide an interface between the LCN 120 and the UCN 14 and the LCN 120 and the data highway 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a workstation for one or more plant operators.

A history module (HM) 126 provides mass data storage capability. The history module 126 includes at least one conventional disk mass storage device, such as a Winchester disk, which disk storage device provides a large volume of non-volatile storage capability for binary data. The types of data stored by such a mass storage device are typically trend histories, event histories, . . . or data from which such histories can be determined, data that constitutes or forms CRT type displays, copies of programs for the physical modules . . . .

An application module (AM) 124 provides additional data processing capability in support of the process control functions performed by the controllers associated with the process control subsystem 20, 20' such as data acquisition, alarming, batch history collection, and provide continuous control computational facilities when needed. The data processing capability of the application module 124 is provided by a processor (not shown) and a memory (not shown) associated with the module.

Computer module (CM) 128 uses the standard or common units of all physical modules to permit a medium-to-large scale, general purpose data processing system to communicate with other physical modules of the network 11 and the units of such modules over the LCN 120 and the units of process control subsystems 20, 20' via the highway gateway module 601, and the NIA4 602, respectively. Data processing systems of a computer module 128 are used to provide supervisory, optimization, generalized user program preparation, and execution of such programs in higher-level program languages. Typically, the data processing systems of a computer module 128 have the capability of communicating with other such systems by a communication processor and communication fines.

The local control network 120 (LCN) is a high-speed, bit serial, dual redundant communication network that interconnects all the physical modules of plant control network 11. LCN 120 provides the only data transfer path between the principal sources of data, such as highway gateway module 601, application module 124, and history module 126, and principal users of such data, such as universal operator station module 122, computer module 128, and application module 124. LCN 120 also provides the communication medium over which large blocks of data, such as memory images, can be moved from one physical module, such as history module 126, to universal station module 122. LCN 120 is dual redundant in that it consists of two coaxial cables that permit the serial transmission of binary signals over both cables.

Figure 2:
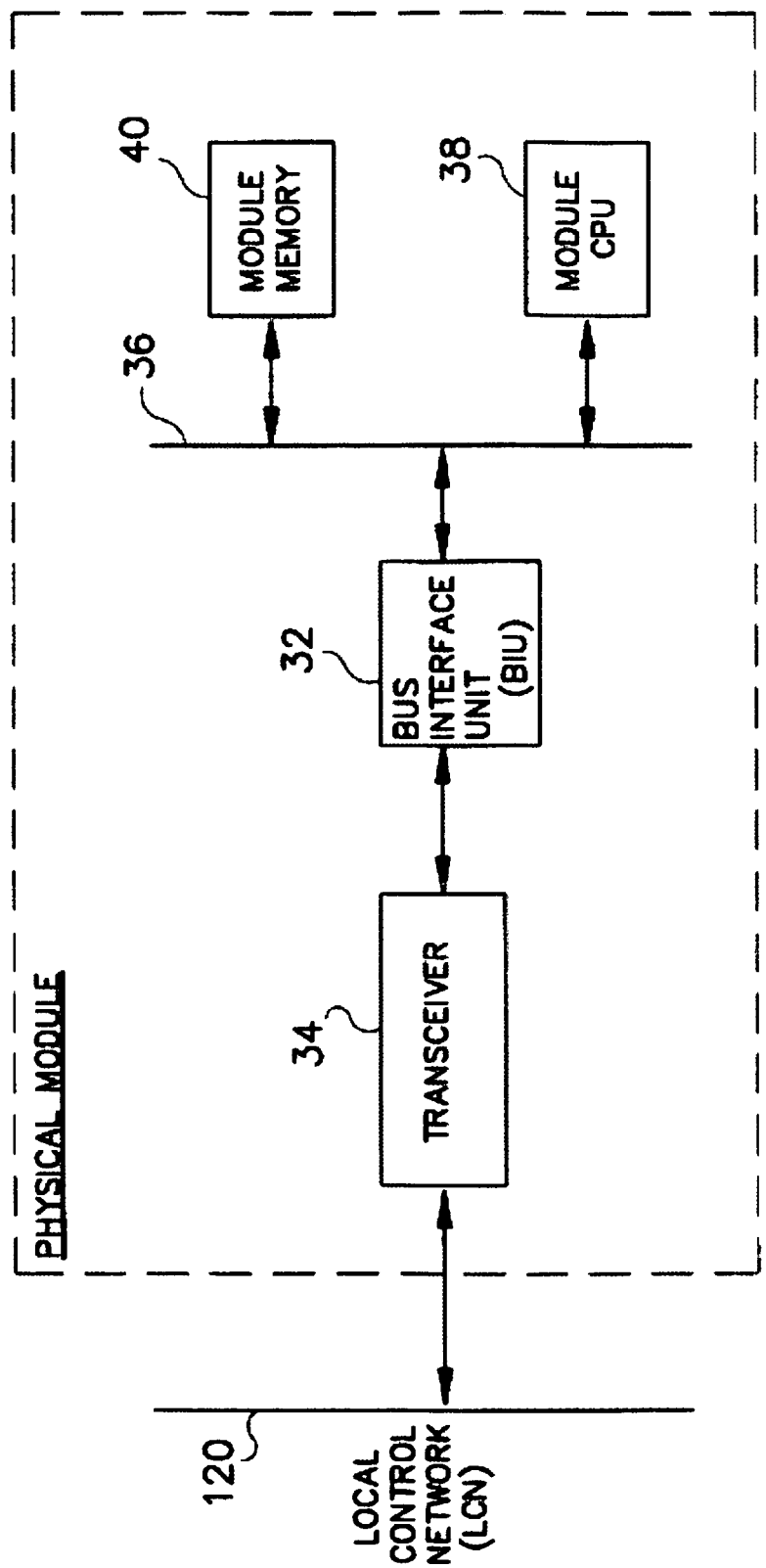
FIG. 2 shows a block diagram of common elements of each physical module of the process control system of FIG. 1.

Referring to FIG. 2, there is shown a block diagram of the common elements of each physical module of the network 11 or the process control system 10. Each of the physical modules includes a module central processor unit 38 and a module memory 40, a random-access memory (not shown), and such additional controller devices, or units (not shown), which are configured to provide the desired functionality of that type of module, i.e., that of the operator station 122, for example. The data-processing capabilities of each module's CPU 38 and module memory 40 create a distributed processing environment that provides for improved reliability and performance of network 11 and process control system 10. The reliability of network 11 and system 10 is improved because, if one physical module of network 11 fails, the other physical modules will remain operational. As a result, the network 11 as a whole is not disabled by such an occurrence as would be the case in centralized systems. Performance is improved by this distributed environment in that throughput and fast operator response times result from the increased computer processing resources and the concurrency and parallelism of the data-processing capabilities of the system.

As mentioned above, each physical module includes the BUS interface unit (BIU) 32, which is connected to the LCN 120 by the transceiver 34. Each physical module is also provided with the module BUS 36 which, in the preferred embodiment, is capable of transmitting 16 bits of data in parallel between the module CPU 38 and the module memory 40. Other units, utilized to tailor each type of physical module to satisfy its functional requirements, are operatively connected to module BUS 36 so that each such unit can communicate with the other units of the physical module via its module BUS 36. The BIU 32 of the physical module initiates the transmission of data over LCN 120. In the preferred embodiment, all transmissions by a BIU 32 are transmitted over the coaxial cables which, in the preferred embodiment, form the LCN 120.

Figure 3:
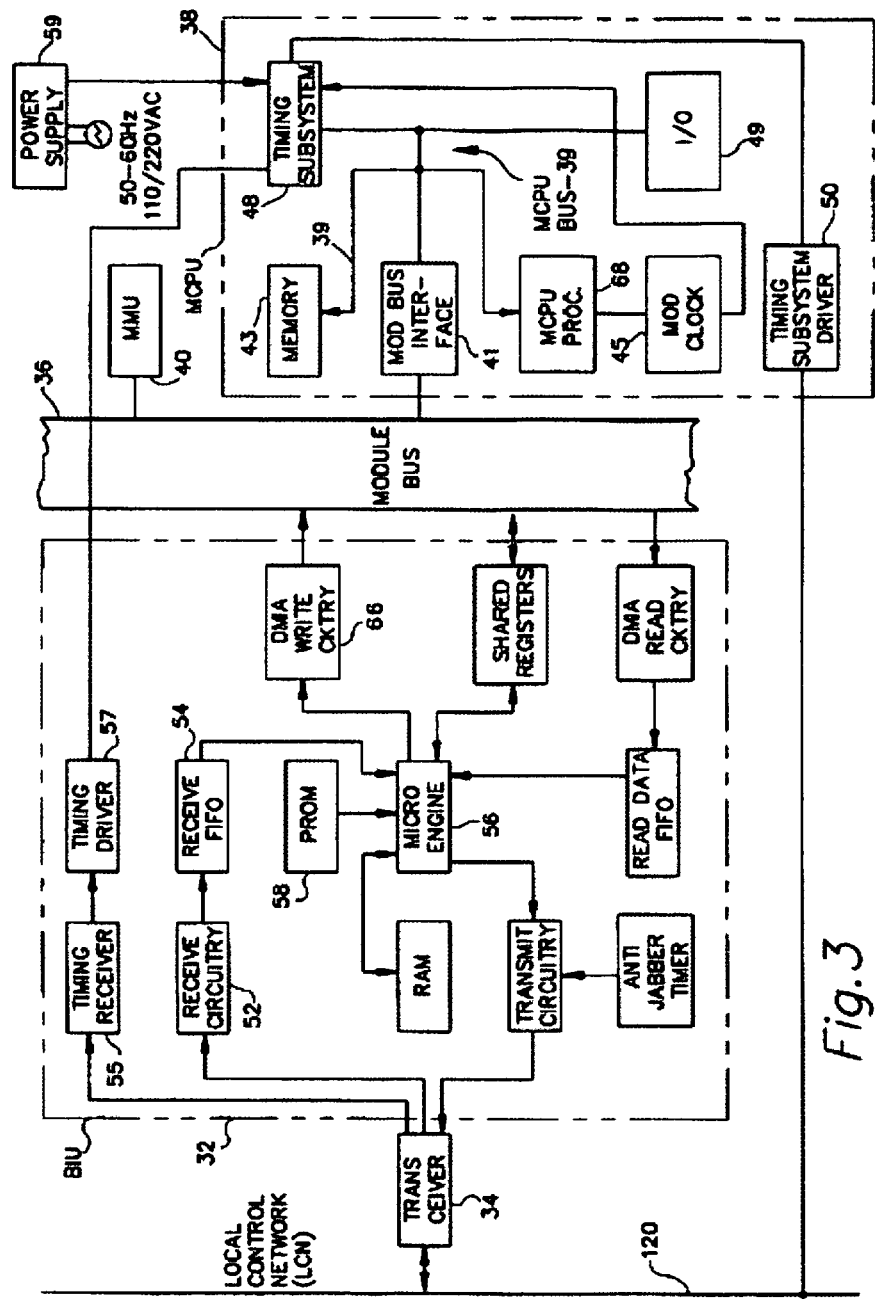
FIG. 3 shows a functional block diagram of a typical physical module of the process control system.

Referring to FIG. 3 there is shown a functional block diagram of a typical physical module 122, 124, 126, 128 of the plant control network 11, and includes the BUS 32 and the transceiver 34, which connects BIU 32 to the LCN 120. BIU 32 is capable of transmitting binary data over LCN 120 and of receiving data from LCN 120. Transceiver 34, in the preferred embodiment, is transformer coupled to the LCN 120. In the preferred embodiment, the LCN 120 is a dual-redundant coaxial cable with the capability of transmitting bit serial data. BIU 32 is provided with a very fast micro-engine 56. In the preferred embodiment, micro-engine 56 is made up of bit slice components so that it can process eight bits in parallel and can execute a 24 bit microinstruction from its programmable read-only memory (PROM) 58.

Signals received from the LCN 120 are transmitted by transceiver 34 and receive circuitry 52 to receive FIFO register 54. Micro-engine 56 examines the data stored in FIFO register 54 and determines if the information is addressed to the physical module. If the data is an information frame, the received data is transferred by direct memory access (DMA) write circuitry 66 by conventional direct memory access techniques to the physical module memory unit (MMU) 40 over module BUS 36.

Communication between MCPU processor 68, a Motorola 68020 microprocessor in the preferred embodiment, and other functional elements of MCPU 38 is via local microprocessor BUS 39. Module BUS interface element 41 provides the communication link between local BUS 39 and module BUS 36. Processor 68 executes instructions fetched from either its local memory 43, in the preferred embodiment an EPROM, or from MMU 40. Processor 68 has a crystal-controlled clock 45 which produces clock pulses, or timing signals. Input/output (I/O) port 49 provides communication between MCPU 38 and equipment external to the physical module to permit program loading and the diagnosis of errors, or faults, for example.

Each MCPU 38 includes a timing subsystem 48 which, in response to clock signals from module clock 45, produces fine resolution, synchronization, and real-time, timing signals. Any timing subsystem 48, which is provided with a timing subsystem driver 50, has the capability of transmitting timing information to other physical modules over the LCN 120. Another input to each timing subsystem 48 is timing information which is transmitted over LCN 120 and which is received through transceiver 34, timing receiver 55, and timing driver 57 of BIU 32. Timing pulses from module power supply 59, which are a function of the frequency of the external source of A.C. electric power applied to power supply 59, are used by timing subsystem 48 to correct longer-term frequency drift of the clock pulses produced by clock 45.

Additional information of the BIU 32 can be found in U.S. Pat. No. 4,556,974. A more detailed description of the process control system 10 can be had by referring to U.S. Pat. No. 4,607,256. Additional information of the individual, common, functional blocks of the physical modules can be had by reference to U.S. Pat. No. 4,709,347, all of the above-identified patents being assigned to the assignee of the present application; and additional information of the process controller 20' can be had by referencing U.S. Pat. Nos. 4,296,464 5,796,403; 5,734,380.

The addition of an interface apparatus which interfaces other systems to the process control system 10 described above and a modification to a graphics generator in the US 122 opens up the existing system, specifically the graphics interface, which includes designing-in the capability to readily permit nodes of differing designs to communicate to the network. In order to open up the graphics interface such that a display which is not on the LCN can be displayed onto the CRT 151 of the US 122, there is included an interface to a graphics card of the US 122 from a co-processor. For more detailed information regarding the opening of the graphics interface, reference can be made to U.S. Pat. No. 5,386,503, entitled "Method for Controlling Window Displays in an Open Systems Windows Environment," and to U.S. Pat. No. 5,530,844, entitled "Method of Coupling Open Systems to a Proprietary Network," both Pat.s being assigned to the same assignee of the present application.

Figure 4:
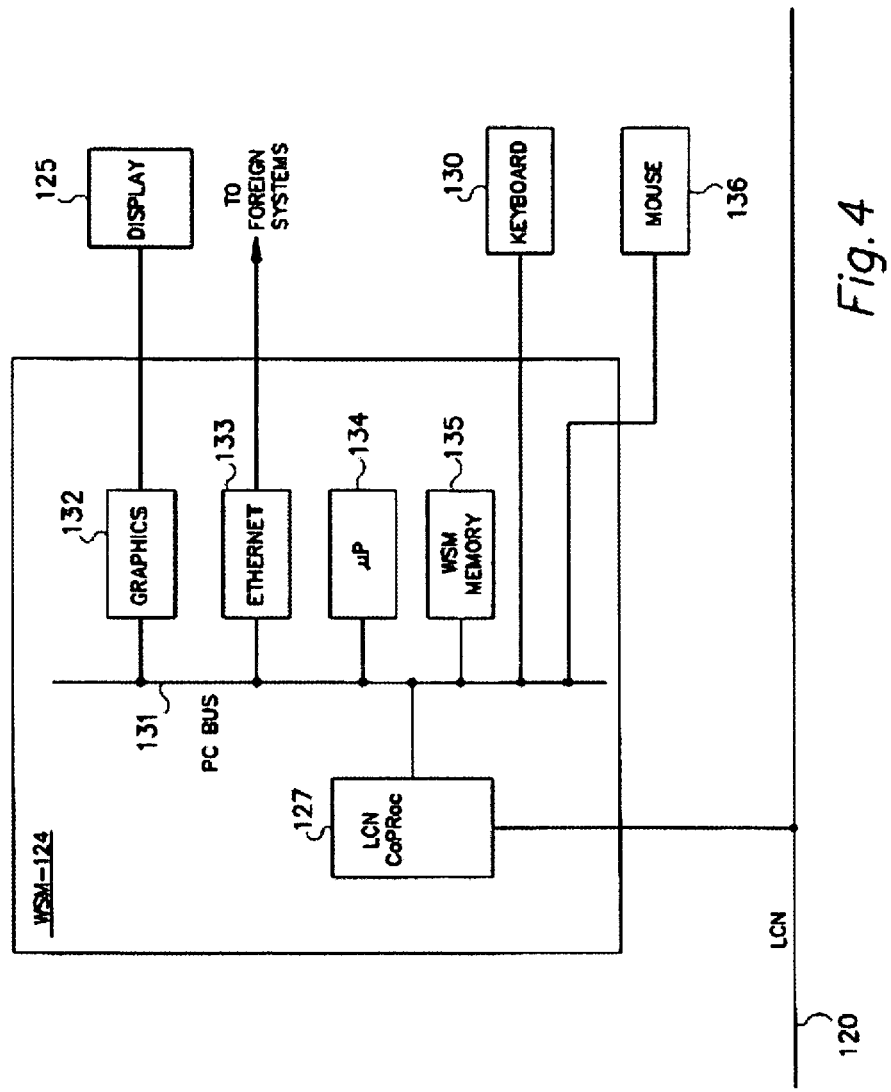
FIG. 4 shows a block diagram of a Workspace Manager Display System of an exemplary embodiment.

The display system which incorporates the method of the present invention will now be described. Referring to FIG. 4, there is shown a block diagram of a Workspace Manager (WSM) Display System of the preferred embodiment. The Workspace Manager Display System, or more simply referred to as Workspace Manager 124, is coupled to the LCN 120 of the process control system 10 in the preferred embodiment. The Workspace Manager (WSM) 124 is a personal computer (PC) which be purchased in the marketplace, and includes an LCN co-processor 127 coupled to the LCN 120 and to an internal BUS (PCBUS) 131 of the PC (i.e., of the WSM 124). The LCN co-processor 127 includes the BIU 32, the module BUS 36, the module CPU 38, and the module memory 40, described above. This configuration permits the WSM 124 to communicate with the LCN 120 and the nodes connected thereto. The WSM 124 includes a graphics card 132 coupled to a display 125 and to the PC BUS 131. An Ethernet card 133 permits the WSM 124 to communicate with foreign systems (i.e., systems not coupled to the LCN 120). A microprocessor (μp) 134 of the PC is coupled to the PC BUS 131 and executes the Operating System and the Workspace Manager software. A WSM memory 135 is also coupled to the PC BUS 131 and stores the various information (including a configuration file, which will be described later) for use by the μp 134. A keyboard 130 and a mouse interface 136 may be used for inputting commands to the WSM 124.

In the microprocessor 134 of WSM 124 there is operating a workspace management program (i.e., software), which behavior has been modified according to the following behavior. A thread to monitor the status of the display or application is spawned when a request is made to close the display, which in one embodiment occurs when the workspace management program determines that a newly invoked display is to replace an existing display. In another embodiment, a request for the display to close may be initiated by another program or by the operator. If the display fails to close within a nominal amount of time or the occurrence of a specified event, the thread may generate an additional request to close the display. In another embodiment, after a brief period of time, if the display has still not actually closed, the thread may generate a request to terminate the application, thereby ensuring closure of the display, and release of its resources. This protocol may be implemented as a standard procedure for all request display closing or based on a window specification file.

A window specification file (sometimes referred to as a configuration file) is provided to the workspace management software—The window specification may be a set of window properties which can be applied to one or more real-application windows during runtime. These properties may include instructions for generating a thread and the actions to be taken by the thread. A plurality of window specifications can be included in a given workspace configuration. At runtime, once the workspace manager associates a real-application window with a particular window specification, that specification's properties are applied and enforced for that application window. For example, a display may generate a thread that generates a second request to close after a set time specified in the specification properties. If the display still fails to close after a second set time, the specification properties may provide for a thread that terminates the application associated with the display.

In the present invention, third-party applications can be dispositioned, not by category, but by title and process file (i.e., module) by matching expression in the configuration file. A third-party application may specify which displays should be ensured closure and what action to take to ensure closure. For example, some application associated with a failed display closure may be terminated in shortened time frame while more critical application may be provided additional time or additional requests to close the display prior, if at all, to terminating the application.

In an exemplary embodiment, the features of the embodiment may be implemented in underlying control system, for example, the Honeywell's TotalPlant Network/TPN system or, in general, Honeywell's SafeView® control system. Embodiments may also be incorporated in the newer generation of Honeywell® control system, called Experion®. The embodiments of the invention are not limited to applications involving control systems. Features may be implemented in any multi-window environment, including an office laptop or desktop such that if a word processing application failed to close, features of the invention may enforce the displays closure.

Figure 5:
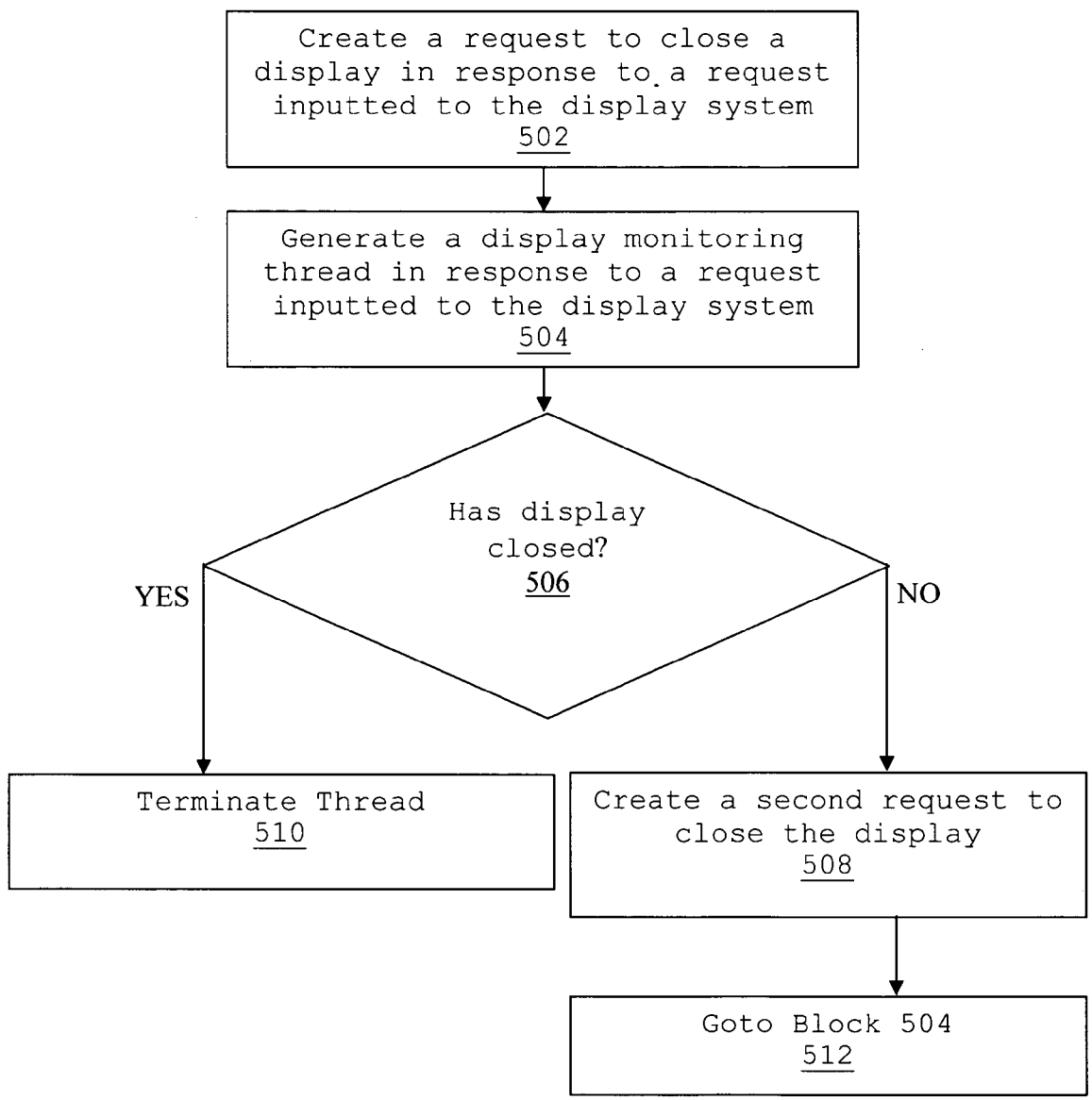
FIG. 5 is a flow chart illustrating a first exemplary method of the present invention.

Referring to FIG. 5, a first exemplary method 500 may be implemented for control displays by the previously disclosed systems. A request to close the display is generated in response to a received request to the display system (block 502). A display monitoring thread may also be generated in response to the request inputted to the display system (block 504). The thread determines if the display has closed (block 506). The thread may wait a predetermined amount of time instructed by the thread or an occurrence. The occurrence may be a second requested inputted to the display system. If the display has closed ("Yes" branch of block 506), the thread may terminate (block 510). If the display has not closed ("No" branch of block 506), the thread may create or trigger the creation of a second request to close the display (block 508). The process may go back to block 504 and generate another thread to continue monitoring the display (block 512). In another example, the same thread may continue to monitor the display and continue to generate display closure requests if the display remains open.

Figure 6:
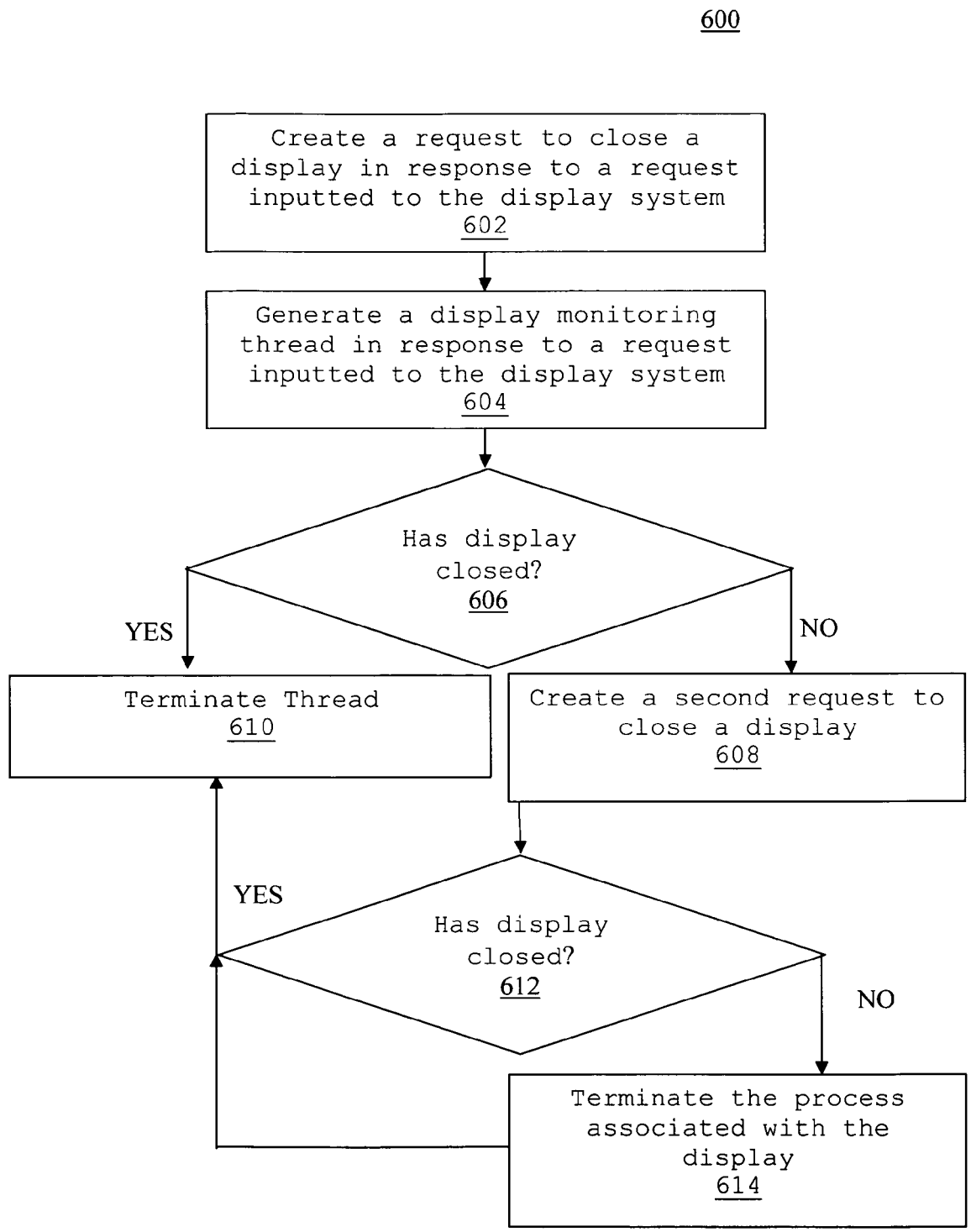
FIG. 6 is a flow chart illustrating a second exemplary method embodiment of the present invention.

Referring to FIG. 6, a second exemplary method 600 may be implemented for control displays and take additional actions to ensure the closure of displays. A request to close the display is generated in response to a received request to the display system (block 602). A display monitoring thread may also be generated in response to the request inputted to the display system (block 604). The thread determines if the display has closed (block 606). As previously discussed in the first exemplary method 500, the thread may wait a predetermined amount of time instructed by the thread or an occurrence. If the display has closed ("Yes" branch of block 606), the thread may terminate (block 610). If the display has not closed ("No" branch of block 606), the thread may create or trigger the creation of a second request to close the display (block 608).

If the display has closed ("Yes" branch of block 612), the thread may terminate (block 610). If the display has not closed ("No" branch of block 612), the thread may create or trigger the creation of a request to terminate the application or process associated with the display (block 614). Prior to triggering the termination of the application, the thread may be set to wait a second predetermined period of time that may be, for example, slightly shorter or longer than first predetermined period of time. In addition, the termination of the application may be triggered by the occurrence of an event. For example, when a second request is received to terminate the display by the display system, the thread may automatically cause the application to terminate even before a request to close the display is generated. The second exemplary method 600 helps to ensure the display closes and does not interfere with new or current display being used by the operator. Once the application has been terminated the thread may terminate (block 610).

The exemplary methods disclosed herein may be implemented in a variety of manners as previously discussed. The threads and instructions associated with the threads may be based on a windows configuration file, as a standard thread for every close display request, or a by a third party application that may generate the thread based on a windows configuration file. Persons skilled in the art will appreciate that the present invention can be practiced by other than the described examples and embodiments, which are presented for purposes of illustration rather than of limitation and that the present invention is limited only by the claims that follow.

What is claimed is:

1. A method comprising:
    associating a specified display with a selected one of multiple window specification files, each window specification file defining properties to be applied to one or more displays in a display system;
    creating a first request to close the specified display in response to a request inputted to the display system;
    generating a display monitoring thread associated with the specified display in response to the request inputted to the display system;
    determining if the specified display has closed using the display monitoring thread;
    when the specified display has not closed in response to at least the first request, generating a second thread that terminates an application associated with the specified display; and
    terminating the display monitoring thread in response to a determination that the specified display has been closed;
    wherein the selected window specification file defines the display monitoring thread and the second thread and actions to be taken by the display monitoring thread and the second thread.

2. The method of claim 1, further comprising:
    creating a second request to close the specified display; and
    determining if the specified display has closed for a second time using the display monitoring thread;
    wherein generating the second thread that terminates the application associated with the specified display comprises generating the second thread when the specified display has not closed for the second time.

3. The method of claim 1, further comprising:
    waiting a predetermined amount of time between generating the display monitoring thread and determining if the specified display has closed.

4. The method of claim 2, further comprising:
    waiting a predetermined amount of time between generating the display monitoring thread and determining if the specified display has closed for the second time.

5. The method of claim 1, further comprising:
    creating a second request to close the specified display;
    determining if the specified display has closed for a second time using the display monitoring thread; and
    creating a third request to close the specified display when the specified display has not closed for the second time.

6. The method of claim 5, further comprising:
    determining if the specified display has closed for a third time using the display monitoring thread;
    wherein generating the second thread that terminates the application associated with the specified display comprises generating the second thread when the specified display has not closed for the third time.

7. A non-transitory machine-readable medium having instructions stored thereon for causing a machine to perform the acts of:
    associating a specified display with a selected one of multiple window specification files, each window specification file defining properties to be applied to one or more displays in a display system;
    creating a first request to close the specified display in response to a request inputted to the display system;
    generating a display monitoring thread associated with the specified display in response to the request inputted to the display system;
    determining if the specified display has closed using the display monitoring thread;
    when the specified display has not closed in response to at least the first request, generating a second thread that terminates an application associated with the specified display; and
    terminating the display monitoring thread in response to a determination that the specified display has been closed;
    wherein the selected window specification file defines the display monitoring thread and the second thread and actions to be taken by the display monitoring thread and the second thread.

8. The machine-readable medium of claim 7, further comprising instructions for causing the machine to perform the acts of:
    creating a second request to close the specified display; and
    determining if the specified display has closed for a second time using the display monitoring thread;
    wherein the instructions for causing the machine to generate the second thread that terminates the application associated with the specified display comprises instructions for causing the machine to generate the second thread when the specified display has not closed for the second time.

9. The machine-readable medium of claim 7, further comprising instructions for causing the machine to perform the act of:

waiting a predetermined amount of time between generating the display monitoring thread and determining if the specified display has closed.

10. The machine-readable medium of claim 8, further comprising instructions for causing the machine to perform the act of:
waiting a predetermined amount of time between generating the display monitoring thread and determining if the specified display has closed for the second time.

11. The machine-readable medium of claim 7, further comprising instructions for causing the machine to perform the acts of:
creating a second request to close the specified display;
determining if the specified display has closed for a second time using the display monitoring thread; and
creating a third request to close the specified display when the specified display has not closed for the second time.

12. The machine-readable medium of claim 11, further comprising instructions for causing the machine to perform the act of:
determining if the specified display has closed for a third time using the display monitoring thread;
wherein the instructions for causing the machine to generate the second thread that terminates the application associated with the specified display comprises instructions for causing the machine to generate the second thread when the specified display has not closed for the third time.

13. A device comprising:
a memory configured to store multiple window specification files, each window specification file defining properties to be applied to one or more displays in a display system; and
at least one processing unit configured to:
associate a specified display with a selected one of the window specification files;
create a first request to close the specified display in response to a request inputted to the display system, wherein the display system comprises at least one output monitor;
generate a display monitoring thread associated with the specified display in response to the request inputted to the display system;
determine if the specified display has closed using the display monitoring thread; and
generate a second thread that terminates an application associated with the specified display when the specified display has not closed in response to at least the first request;
wherein the device is configured to terminate the display monitoring thread in response to a determination that the specified display has been closed; and
wherein the selected window specification file defines the display monitoring thread and the second thread and actions to be taken by the display monitoring thread and the second thread.

14. The device of claim 13, wherein the at least one processing unit is further configured to:
create a second request to close the specified display; and
determine if the specified display has closed for a second time using the display monitoring thread;
wherein the at least one processing unit is configured to generate the second thread that terminates the application associated with the specified display when the specified display has not closed for the second time.

15. The device of claim 13, wherein the at least one processing unit is further configured to:
wait a predetermined amount of time between generating the display monitoring thread and determining if the specified display has closed.

16. The device of claim 14, wherein the at least one processing unit is further configured to:
wait a predetermined amount of time between generating the display monitoring thread and determining if the specified display has closed for the second time.

17. The device of claim 13, wherein the at least one processing unit is further configured to:
create a second request to close the specified display;
determine if the specified display has closed for a second time using the display monitoring thread; and
create a third request to close the specified display when the specified display has not closed for the second time.

18. The device of claim 17, wherein the at least one processing unit is further configured to:
determine if the specified display has closed for a third time using the display monitoring thread;
wherein the at least one processing unit is configured to generate the second thread that terminates the application associated with the specified display when the specified display has not closed for the third time.

19. The device of claim 16, wherein the at least one processing unit is further configured to:
wait a second predetermined amount of time between generating the display monitoring thread and determining if the specified display has closed for a third time.

20. The method of claim 1, wherein:
a specified number of requests to close the specified display are created prior to generating the second thread that terminates the application associated with the specified display; and
the specified number is based on a criticality of the application associated with the specified display.

21. The method of claim 1, wherein:
the specified display is provided a specified amount of time to close prior to generating the second thread that terminates the application associated with the specified display; and
the specified amount of time is based on a criticality of the application associated with the specified display.

22. The method of claim 1, wherein associating the specified display with the selected window specification file comprises associating the specified display with the selected window specification file at runtime.

* * * * *